United States Patent Office 3,328,194
Patented June 27, 1967

3,328,194
IRRADIATION OF PRESSURE-SENSITIVE ADHE-
SIVE TAPE IN AN OXYGEN-FREE STATE
Andrew A. Kasper, Watertown, Mass., assignor to The
Kendall Company, Boston, Mass., a corporation of
Massachusetts
No Drawing. Filed Dec. 28, 1962, Ser. No. 247,854
16 Claims. (Cl. 117—62)

This invention relates to the irradiation of pressure-sensitive adhesive tape, specifically the irradiation of the pressure-sensitive adhesive of said tape, with light energy having wavelengths in the ultraviolet region, and to the irradiated adhesive and tape.

Pressure-sensitive adhesive tape consists, basically, of a layer of a pressure-sensitive adhesive upon a backing member. Conventionally, the backing member is a flexible sheet material to which the adhesive is bonded. Materials most often used as flexible backing members are fabrics (both woven and nonwoven), papers and a variety of plastic films, such as cellophane film, vinyl film and polyethylene film. Rigid materials may also be used as backing members for the adhesive layer, but such products are by and large specialty products finding only limited use. For the purposes of this invention rigid backing members and flexible backing members carrying adhesive layers are considered as tapes.

The three properties characteristic of pressure-sensitive adhesive are cohesion, adhesion and tack. Tack is the stickiness of the adhesive and is related to the aggressiveness of the adhesive for attachment to other surfaces. Adhesion is the property generally ascribed to the ability of the adhesive to remain attached to the other surface without slippage at the interface between the adhesive surface and the other surface. Cohesion is the internal strength of the adhesive. The cohesive strength of the adhesive must be sufficient to resist splitting of the adhesive layer when the adhesive is removed from the other surface or when subjected to shearing forces as may be encountered for example, in applications of pressure-sensitive adhesive tapes as strapping tapes.

Pressure-sensitive adhesives having the required balance of tack, adhesion and cohesion are of the well known rubber-resin type. The base component in these adhesives is a rubbery elastomer, either natural or synthetic. Examples of the rubbery elastomers are pale crepe rubber, smoked sheet rubber, butadiene-styrene rubber, butadiene-acrylonitrile rubber, butyl rubber, cis-polyisoprene rubber, polyisobutylene rubber and neoprene rubber. These rubbery elastomers are blended with tackifier resins which serve to contribute to the tack and adhesion properties of the adhesive. Some synthetic polymers are known to exhibit by themselves a balance of cohesion, adhesion and tack for satisfactory pressure-sensitive adhesive purposes; these polymers for the purpose of this invention are considered the equivalent of the rubber-resin type pressure-sensitive adhesives. An example of an acrylate-type rubbery elastomer single component pressure-sensitive adhesive is a copolymer of 15 parts of acrylonitrile and 85 parts of isoamyl acrylate. Examples of tackifier resins are wood rosin, disproportionated rosin, rosin esters (such as the methyl, glycerol and pentaerylthritol esters of wood rosin), hydrogenated wood rosin and rosin esters, polyterpene resins, terpene-bicycloheptadiene resins and polymerized petroleum hydrocarbon resins.

The cohesive strength of the pressure-sensitive adhesive is attributable to the rubbery elastomer. As stated, the tackifier resins contribute to the tackiness and adhesion. The preparation of an adhesive, particularly in the calender spreading of adhesives in the manufacture of tapes, involves considerable mixing and mastication of the rubbery elastomer. In general, the mixing and mastication steps results in breakdown of the rubbery elastomer, thereby reducing the cohesive strength of the rubbery elastomer.

The cohesion and in some instances the thermal stability of pressure-sensitive adhesives can be up-graded by cross-linking the rubbery elastomer with chemical cross-linking agents. Sulfur and sulfur-containing compounds have been employed as cross-linking agents. Only relatively minor amounts of the sulfur type cross-linking agents are used in order to avoid destroying the critical balance between cohesion, adhesion and tack. The use of chemical cross-linking agents to improve cohesive strength has several disadvantages. The necessity of uniform dispersion of the cross-linking agent in the rubbery elastomer requires additional mixing steps. The temperature of the mass during the mixing process must be carefully controlled to prevent premature reaction between the rubbery elastomer and cross-linking agent. The presence of unreacted cross-linking agents in the final product renders the adhesive potentially unstable, particularly unstable to high temperatures that may be encountered during storage and use.

This invention is directed to a method of improving the cohesive strength of pressure-sensitive adhesive by means other than chemical cross-linking agents. In accordance with this invention a layer of a pressure-sensitive adhesive is exposed to ultraviolet light under conditions to produce a beneficial improvement in the cohesive strength of the adhesive without any significant adverse effect on the tack and adhesion of the adhesive. Included within the scope of this invention in particular is a process of utilizing high intensity sources of ultraviolet light radiation in the irradiation of the adhesives. As shown in the following disclosure, ultraviolet light energy can effect a substantial improvement in the cohesive strength of pressure-sensitive adhesives. An improvement can be produced by exposing the adhesive to the total output of low intensity sources of ultraviolet light. In the case of high intensity light sources, however, it was discovered that exposure of adhesives thereto exhibited a general degradation of adhesive properties. This invention provides a processing system in which high intensity light sources are utilized to advantage to obtain the desired improvement in cohesive strength of the adhesive.

The cohesive strength of an adhesive may be measured by means of a creep resistance test. In general, this test measures the resistance of an adhesive layer to shearing in the plane of the adhesive layer. The creep resistance test by which the cohesive strengths of the tapes were measured is as follows. The test sample is a strip of pressure-sensitive adhesive tape 1" wide and about 6" long.

The test sample, with the adhesive surface against a stainless steel panel, is uniformly pressed upon the panel. The panel is about 1¾" x 2". The strip of tape is aligned longitudinally on the panel, providing an area of contact between the panel and tape of two square inches. One end of the tape coincides with a top edge of the panel; the other end of the tape extends beyond the opposite edge of the panel. About 24 hours after attachment to the panel, the panel is attached to the vertical surface of a heated bar (160°±5° F.) so that the portion of the tape sample not attached to the panel hangs freely therefrom in the plane of the tape sample. The panel and the tape sample are permitted to come to thermal equilibrium (approximately 15 minutes). A 1000 gram weight is attached to the bottom, free end of the tape sample and the time noted. The distance from the top edge of the panel to the top edge of the tape sample is periodically measured. The time for the tape to move one-half an inch from the top edge of the panel, based upon the increments of movement noted at regular time intervals, is the creep time. The creep ratio is the ratio of the creep time of the irradiated tape of this invention and the creep time of an unirradiated sample of the same tape.

Low intensity ultraviolet light

Low pressure mercury vapor lamps are sources which provide ultraviolet light at relatively low intensities. Low pressure lamps may be of the hot cathode type or cold cathode type. The former type operate at lower voltages than the latter. Regardless of the type, all low pressure mercury vapor lamps operate at low lamp temperatures (usually not above 120° F.) and are sources of ultraviolet light principally in the region of about 2500 Angstroms. For purposes of this invention low intensity light sources are those radiating light at an intensity no greater than about that provided by a cylindrical lamp source emitting up to a maximum of about 1 watt of light per inch of cylinder length of the lamp. Suitable lamp sources of this general character are the well known germicidal lamps and are available commercially under a variety of trade names.

Irradiation of pressure-sensitive adhesives with the low intensity sources of ultraviolet light require radiation times of at least one minute to produce a significant improvement in the cohesive strength of the adhesive. When exposed to the field of light in an air atmosphere, the adhesive must contain a sensitizing agent. The sensitizing agent is not necessary when oxygen is excluded from the surface of the adhesive during irradiation; however, the sensitizing agent does serve to accelerate the reaction occurring in the adhesive which produces an increase in creep resistance regardless of the presence or absence of oxygen. Generally, the period of exposure to the field of light radiated by a low intensity lamp source need not exceed about 10–15 minutes. This is illustrated in the following example.

The ultraviolet light source was a General Electric low pressure mercury vapor germicidal lamp (G15T8). The lamp was 18" long and 1" in diameter. The rated total ultraviolet output, principally in the 2537 Angstrom wavelength region, was 3.6 watts (about .2 watts of ultraviolet light energy per inch of lamp length).

A pressure-sensitive adhesive tape was prepared by solvent spreading upon a cellophane backing an adhesive consisting of 60 parts of pale crepe rubber, 40 parts of a polyterpene resin having a softening point of about 125° C. and one part of benzophenone. The adhesive layer was about 1–2 mils thick. The solvent was evaporated from the adhesive layer by drying in air. The adhesive surface was covered with a thin polyethylene film. The adhesive tape was placed about 2–3 inches from the lamp and exposed to the field of light from the lamp for 15 minutes.

Samples of both the unirradiated and irradiated tapes were tested for creep resistance in accordance with the test described above. The control sample (unirradiated) crept 0.500" at the end of 38.8 hours. The irradiated tape had crept only 0.056" at the end of 422 hours. In an attempt to test the limit of the cohesive strength of this tape the load attached to the free end of the tape was increased to 1500 grams. No change in position of the tape was noted during 24 hours under the increased load conditions.

Benzophenone is a sensitizing agent. Compounds which are sensitizers are aromatic aldehydes and aromatic ketones in which the aromatic groups are free of phenolic hydroxyls. In addition to benzophenone, compounds of considerable sensitizing activity in rubber-resin pressure-sensitive adhesive compositions are xanthone, chloro-substituted benzoquinones (e.g., chloranil) and substituted benzophenone derivatives such as 4,4'-bis(diethylamino) benzophenone, 4,4'-dichlorobenzophenone and 4-chlorobenzophenone. Only relatively minor amounts of the sensitizer need be present in the adhesive, generally in the range of about 0.5% to 2% by weight of the rubbery elastomer in the adhesive.

High intensity ultraviolet light

In view of the results obtained with low intensity ultraviolet irradiation, it appeared that the use of high intensity ultraviolet light sources would serve to produce the same objective in shorter periods of time. However, exposing adhesive tapes to high intensity ultraviolet light sources in the manner described above in the case of the low intensity sources proved disastrous to the creep resistance property of the adhesives. Contrary to the expected improvement in cohesive strength it was found that the cohesive strength of the adhesive could be practically destroyed. This occurred whether the adhesive was exposed to air or protected against oxygen during the exposure.

In order to improve the cohesive strength of pressure-sensitive adhesives employing a high intensity ultraviolet light source to provide the light field, it was found necessary to prevent a temperature rise in the adhesive above about 100–120° F. during exposure to the light. This upper limit of temperature may vary somewhat depending upon the adhesive composition and the spectrum of light emitted by the source of light. Generally, the temperature of the adhesive during exposure in accordance with this invention is maintained at a temperature at which the rate of the reaction in the adhesive producing an increase in creep resistance exceeds the rate of the reaction causing a reduction in creep resistance of the adhesive. The use of the singular form of the term "reaction" in the preceding sentence is not intended to convey a limitation that there is only one reaction resulting in improved cohesive strength and one reaction resulting in a reduction in cohesive strength. Each reaction may be a reaction system of one or more reactions. Indeed more than one reaction may be responsible for the reduction in cohesion. Thus, an oxidative degradative reaction may not be solely responsible for the reduction in cohesive strength in view of the fact that a reduction in cohesive strength occurs when the adhesive is exposed to a high intensity light source at ambient temperatures whether or not the adhesive is protected from oxygen.

High pressure mercury vapor lamps are sources which provide ultraviolet light at relatively high intensities. Such high pressure lamps characteristically emit not only ultraviolet light but also large quantities of light energy in the visible and infrared regions. For the purpose of this invention high intensity light sources are those radiating ultraviolet light at an intensity at least equal to that provided by a cylindrical lamp source emitting about 5 watts of ultraviolet light per inch of cylinder length of the lamp. In accordance with this invention the objective of at least a three-fold improvement in creep resistance of the adhesive can be obtained utilizing high intensity ultraviolet light sources upon exposure times ranging from a fraction of a second to about 20 seconds.

The 360 watt lamp and the 1500 watt lamp referred to in the following examples were manufactured by the General Electric Company under the designations 360-UA-3 and H1500-A23 (H23KX), respectively. The emission characteristics as reported by the manufacturer are set forth in Table I. The ratio of infrared output to ultraviolet output for the 360 watt lamp was 8.2 and the ratio for the 1500 watt lamp was 1.6.

TABLE I

| Wave Length, Angstroms | 360 Watt Lamp (6" long) | | 1,500 Watt Lamp (12" long) | |
| --- | --- | --- | --- | --- |
| | Wattage | Watts/in. | Wattage | Watts/in. |
| UV Range: | | | | |
| 2,200–2,800 | 10.36 | 1.72 | 189 | 15.7 |
| 2,800–3,200 | 13.72 | 2.29 | 157 | 13.1 |
| 3,200–4,000 | 12.23 | 2.04 | 140 | 11.7 |
| Total UV | 36.31 | 6.05 | 486 | 40.5 |
| Visible: 4,000–8,000 | 25.10 | 4.10 | 227 | 18.9 |
| Infrared: (>8,000) | 298.0 | 49.6 | 787 | 65.3 |

The 360 watt lamp was housed in a box-like reflector having an opening approximately 1⅛" wide and 6" long in the bottom wall of the housing. The lamp was positioned over the opening with the longitudinal axis of the lamp aligned with the lengthwise measurement of the opening. Pending downwardly from the bottom wall of the housing was a collar, the walls of which were coincident with the edges of the opening. The collar formed a channel through which the light could travel. The open end of the collar was 4" from the lamp. A tape sample passing immediately beneath the open end of the collar thus was exposed to the field of light at a distance of 4" from the lamp. An extension collar was provided of suitable length and was slipped over the first collar for purposes of exposing tapes at a distance of 8" from the lamp.

The 1500 watt lamp was housed in a reflector of semi-elliptical cross-section. The reflector was constructed and the lamp so placed therein that the minor axis of the ellipse was four inches from the center axis of the 1500 watt lamp. The major focus of the ellipse was 8" from the lamp.

In all of the following examples the tapes were passed under the lamps in the direction of the longitudinal axes of the lamps. The temperature of the 360 watt container measured on the walls of the container at 4" from the lamp usually was in the region of about 300° F.; at about 8" from the lamp the temperature was in the region of about 265° F. The temperature of the 1500 watt housing during operation was usually about 100° F. to 125° F. higher than the temperature of the 360 watt housing.

EXAMPLE 1

This example illustrates the reduction in creep resistance of various adhesive compositions as a result of irradiation under the 360 and 1500 watt lamps, no provision being made to control the temperature of the adhesives. Adhesive tape samples were prepared with these different adhesive compositions coated on polyethylene film. The adhesives were as follows.

*Adhesive A* consisted of a mixture of 74 parts smoked sheet, 26 parts polyisobutylene rubber (Vistanex L-100), 62.5 parts polyterpene tackifier resin (softening point about 85° C.), 1.84 parts synthetic beeswax and age resisters consisting of a mixture of 1.84 parts polymerized trimethyl dihydroquinoline (AgeRite Resin D) and 0.45 parts N,N-diorthotolylethylene diamine (Stabelite Alba).

*Adhesive B* was the same as Adhesive A except that 11 parts butadiene-styrene rubber (GRS-1022) was substituted for 11 parts of the polyisobutylene rubber.

*Adhesive C* consisted of a mixture of about 50 parts smoked sheet, 50 parts butadiene-styrene rubber (SBR-1011), 10 parts of a polyterpene resin (softening point about 115° C.), 16 parts of a polymerized hydrocarbon resin (Piccopale 100) and 2 parts of disproportionated wood rosin. The adhesive contained a mixture of finely divided silica, zinc oxide and Dixie clay and titanium dioxde as fillers. The adhesive contained less than 1 percent each of the zinc salt of 2-mercaptobenzothiazole (Zenite Regular), 2,5-di-t-amylhydroquinone (Santovar A), and dipentamethylene-thiuram tetra sulfide (Tetrone A).

Samples of these adhesive tapes were exposed to the two ultraviolet lights at different lamp to sample distances and different periods of exposure. Different exposures were obtained by varying the rate at which the tape was passed beneath the openings in the lamp housings. The operating conditions and the creep ratio data are set forth in Table II.

TABLE II

| Adhesive | Lamp Distance, in. | Exposure in sec. | Dose | | Watt-Sec. | Creep Ratio |
| --- | --- | --- | --- | --- | --- | --- |
| | | | UV | IR | | |
| Irradiated with 360 watt lamp | | | | | | |
| A | 8 | 4 | 72 | 600 | | .01 |
| | 8 | 8 | 145 | 1,200 | | .23 |
| | 4 | 4 | 145 | 1,200 | | .14 |
| | 4 | 8 | 289 | 2,400 | | .06 |
| B | 8 | 4 | 72 | 600 | | .17 |
| | 8 | 8 | 145 | 1,200 | | .01 |
| | 4 | 4 | 145 | 1,200 | | .03 |
| | 4 | 8 | 289 | 2,400 | | .00 |
| C | 8 | 4 | 72 | 600 | | .54 |
| | 8 | 8 | 145 | 1,200 | | .04 |
| | 4 | 4 | 145 | 1,200 | | .00 |
| Irradiated with 1,500 watt lamp   A=Minor Axis F=Focus | | | | | | |
| A | 4-A | .3 | 108 | 196 | | .45 |
| | 4-A | .6 | 218 | 393 | | .00 |
| | 8-F | .3 | 145 | 262 | | .25 |
| | 8-F | .6 | 291 | 524 | | .01 |
| B | 4-A | .3 | 108 | 196 | | .71 |
| | 4-A | .6 | 218 | 393 | | .00 |
| | 8-F | .3 | 145 | 262 | | .61 |
| | 8-F | .6 | 291 | 524 | | .03 |
| C | 4-A | .6 | 218 | 393 | | .04 |

Every irradiation dose produced a reduction in creep resistance. Creep ratios of less than 1 also are the result of irradiating adhesives without temperature control but protected against oxygen. As the data show, the adhesives behaved similarly relative to dosage of light energy in the ultraviolet region, regardless of the source. Analysis of the data shows, however, that the effect of infrared dosage upon cohesive strength is different for each lamp.

It was discovered that the cohesive strength of pressure-sensitive adhesives could be substantially improved by taking certain steps during the exposure to minimize or eliminate the reacton causing degradation of the adhesive properties. This has been accomplished by immersing the adhesive tape in a liquid coolant transparent to light rays in the ultraviolet region. In this system oxygen in the atmosphere is excluded from the adhesive surface. Although sensitizers are not necessary under these conditions, the presence of the same in the adhesive is preferred. Instead of an immersion step, a filter opaque to light other than light in the ultraviolet region may be interposed between the lamp and the adhesive. The adhesive surface may or may not be protected against oxygen in this modification of the process. Direct irradiation under exposure to the complete spectrum of light emanating from a high intensity ultraviolet light sources, such as the high pressure lamps, is permissible provided the temperature of the adhesive is maintained within the limits aforedescribed.

EXAMPLE 2

In the example the adhesive tape was immersed in water during exposure to the 360 watt lamp. An adhesive consisting of 50 parts pale crepe rubber, 50 parts butadiene-styrene rubber, 67 parts polyterpene, 1 part polymerized trimethyldihydroquinoline and a minor amount of silica as filler was prepared in a solvent. A strip of polyester film (polyethyleneterephthalate film) was coated with the adhesive. The dried adhesive coating was about 1.5 mils thick.

A water tank was provided with an inlet and outlet for water. The water flowing in the pan was at a temperature below 100°–120° F. The adhesive tape samples were immersed in the water during the exposure periods. The tapes exposed to the lamp at rates of 8 sec./inch and 16 sec./inch of tape exhibited from three to ten-fold improvement in creep resistance.

Distilled water is substantially transparent to ultraviolet light and may be preferred as a liquid coolant. The liquid need not be opaque to infrared light, as in the case of water, for the purpose of the immersion mode of this process.

EXAMPLE 3

Adhesive tape was irradiated in accordance with the immersion method under the 1500 watt lamp. The water was distilled water. The water tank was positioned under the housing so that the immersed tapes were located at about the minor axis of the semi-elliptical reflector. The water was circulated from the tank outlet, through a cooling coil, and then to the tank inlet. The water temperature was reduced from about 45°–65° C. to about 35° C.

Several adhesives were prepared, differing in the nature of the sensitizer. The adhesives consisted of 100 parts pale crepe rubber, 67 parts of polyterpene resin (softening point 115° C.), 1.6 parts polymerized trimethyldihydroquinoline, 0.56 parts Stabelite Alba, and 0.88 part sensitizer. The adhesive was coated upon a film backing. The exposure times and creep resistances are set forth in Table III. In Adhesive A the sensitizer was chloranil; in Adhesive B, 4,4'-bis(diethylamino)benzophenone; and in Adhesive C, 4,4'-bis(dimethylamino)benzophenone. The pale crepe rubber prior to compounding with the other ingredients had been milled for about 40 minutes.

TABLE III

| Adhesive | Exposure (seconds) | | | |
|---|---|---|---|---|
| | 0.0 | 2.0 | 5.0 | 10 |
| | Creep Time (hours) | | | |
| A | 1.6 | 2.8 | 3.7 | 10.4 |
| B | 2.0 | 10.0 | 31.0 | 264.0 |
| C | 1.6 | 1.5 | 3.3 | 10.4 |

EXAMPLE 4

Pressure-sensitive adhesive tapes prepared by coating a film backing with Adhesive B of Example 1 were irradiated in a dry state with a water filter interposed between the 360 watt lamp source and the tape samples. Surprisingly, it was discovered that the polymerized trimethyldihydroquinoline ingredient appeared to serve as a sensitizer when the adhesive was irradiated in a nitrogen atmosphere which protected the adhesive from oxygen in the atmosphere. A several-fold improvement can be obtained in this system. To benefit from the sensitizing action of the quinoline compound it is necessary that the adhesive be protected from oxygen during irradiation.

The filter means in this example consisted of a tank with a polyethylene film in bottom of the tank serving as a "window" through which the ultraviolet light could pass. The tank contained a thin layer of water. The filters may be comprised of any materials which are transparent, or substantially so, to ultraviolet light and opaque to infrared light. This filter method of operation may also be supplemented by the step of direct cooling (other than by immersion in a liquid coolant) of the tapes during the exposure period.

EXAMPLE 5

The tapes of this example were cooled by contact with a cooling surface during the period of exposure to the 1500 watt lamp. The cooling device consisted of a hollow container through which refrigerated water was circulated. The top surface of the container was convex. The container was placed at about the minor axis of the semi-elliptical lamp housing so that a tape travelling over the convex surface traversed a path varying in distance from the lamp of from about 4 to 3 inches. The adhesive tapes were carried upon a silicone carrier belt, the carrier belt being directed against and over the convex cooling surface as the belt and the tape thereon passed through the exposure zone. Prior to receiving the tape, the belt was moistened with water. The moisture acted as a heat sump, helping to cool the tape during the process. The tape was carried on the belt with the adhesive surface facing toward the lamp. Tapes were irradiated in an air atmosphere and a nitrogen atmosphere. These gases were directed under the reflector to cover the adhesive surface at a 10–15 p.s.i. expansion pressure differential.

The tape backing was polyethylene-terephthalate film (Mylar). One series of adhesives (P-20) coated upon the films, differing in content of certain additives as indicated in Table IV, consisted of 100 parts of pale crepe rubber milled for 20 minutes, about 67 parts of polyterpene resin (softening point 115° C., 1.6 parts of polymerized trimethyldihydroquinoline, 0.56 parts of Stabelite Alba and, when present, 0.88 part of 4,4'-dichlorobenzophenone (DCBP), 2.15 parts of triphenyl phosphite (TPP) and 2 parts of methyl zimate (MZ). Another series of adhesives (P-40) was composed of the same ingredients as the P-20 adhesive except that the pale crepe rubber was milled for 40 minutes. The composition of the third series of adhesives (G-20) of Table IV was the same as the P-20 and P-40 adhesives except that the rubbery elastomer consisted of a mixture of 70 parts of 20 minute milled pale crepe rubber and 30 parts of gel free butadiene styrene rubber (GRS-1022). The presence of the various additives are designated by the the letter "X" and the absence thereof by the letter "O" in Table IV. The creep times in hours for samples exposed for 2, 5 and 10 seconds are set forth in the table.

TABLE IV

| Sample | Composition | | | Air | | | | N₂ | | |
|---|---|---|---|---|---|---|---|---|---|---|
| | DCBP | TPP | MZ | 0.0 sec. | 2.0 sec. | 5.0 sec. | 10.0 sec. | 2.0 sec. | 5.0 sec. | 10.0 sec. |
| P-20: | | | | | | | | | | |
| 1 | X | X | X | 24 | 42 | 49 | >303 | 138 | >251 | >215 |
| 2 | X | O | X | 33 | | | >286 | | | |
| 3 | X | X | O | 18 | | | 204 | | | |
| 4 | O | X | X | 25 | | | 1.3 | | | |
| 5 | O | X | O | 38 | | | 4.1 | | | |
| 6 | O | O | X | 30 | | | 4.3 | | | |
| 7 | O | O | O | 27 | 8.6 | 1.6 | 0.5 | 69 | 102 | >251 |
| P-40: | | | | | | | | | | |
| 8 | X | X | X | 2.1 | 2.9 | 5.0 | 10.8 | 5.7 | 9.2 | 37 |
| 9 | X | O | X | 2.9 | | | 9.4 | | | |
| 10 | O | X | X | 2.6 | | | 1.1 | | | |
| 11 | O | X | O | 4.6 | | | 2.4 | | | |
| 12 | O | X | O | 2.4 | | | 1.5 | | | |
| 13 | X | O | O | 3.7 | | | 49.0 | | | |
| 14 | O | O | O | 2.8 | 1.8 | 0.9 | 0.6 | 5.2 | 8.7 | 178 |
| G-20: | | | | | | | | | | |
| 15 | X | X | X | 24 | 27 | 31 | 136 | 77 | 111 | 143 |
| 16 | X | O | X | 21 | | | 134 | | | |
| 17 | X | X | O | 16 | | | 125 | | | |
| 18 | O | X | X | 18 | | | 10 | | | |
| 19 | O | X | O | 24 | | | 9 | | | |
| 20 | O | O | X | 14 | | | 7 | | | |
| 21 | X | O | O | 25 | | | 244 | | | |
| 22 | O | O | O | 24 | 7.8 | 1.4 | 0.9 | 25 | 67 | 163 |

The tack and adhesion (values not reported) were improved in all cases. As shown by the data of Table IV, the sensitizer must be present when this mode of irradiation is conducted in an air atmosphere. In air irradiation the quinoline compound does not serve as a sensitizer; when the adhesive is protected from oxygen it serves to promote the reaction occurring in the adhesive which increases cohesive strength (see samples 7, 14 and 22).

The organo phosphite serves no beneficial purpose during irradiation in either air or an inert atmosphere, but appears to synergistically cooperate with the sensitizer to improve creep resistance. The organo phosphite should be one in which at least one of the organo groups is a phenyl group.

The foregoing examples show that the effect of light energy causing a reduction in cohesive strength can be reduced or eliminated when exposing pressure-sensitive adhesives to high intensity ultraviolet light sources. Also shown is a process whereby the effectiveness of light energy from such sources causing an increase in creep resistance can be accentuated and accelerated while at the same time reducing or eliminating the reaction tending to reduce the cohesive strength of the adhesive. Modifications and changes in the process will occur to those skilled in the art after having the benefit of the teachings set forth herein and are intended to be within the scope of claimed invention.

The subject matter claimed is:

1. A method of improving the creep resistance of a pressure-sensitive adhesive tape comprising:
   (a) providing a field of light including light having wavelengths in the ultraviolet region between about 2,000 and 4,000 Angstroms from a source radiating said light at an intensity no greater than about that provided by a cylindrical lamp source emitting up to a maximum of about 1 watt of said light per inch of cylinder length;
   (b) exposing the pressure-sensitive adhesive of a tape to the field of light for a period of at least about one minute while excluding oxygen from the surface of the adhesive during said period; and
   (c) removing said pressure-sensitive adhesive from said field of light.

2. A method in accordance with claim 1 wherein said adhesive contains an agent selected from the group consisting of aromatic aldehydes and aromatic ketones, said aromatic groups being free of phenolic hydroxy groups.

3. A method in accordance with claim 2 wherein said agent is a benzophenone compound.

4. A method in accordance with claim 1 for improving the creep resistance of a pressure-sensitive adhesive tape wherein the adhesive contains polymerized trimethyldihydroquinoline.

5. A method of improving the creep resistance of a pressure-sensitive adhesive comprising:
   (a) providing a field of polychromatic light including light having wavelengths in the ultraviolet region between about 2,000 and 4,000 Angstroms from a source radiating light in said ultraviolet region at an intensity at least equal to that provided by a cylindrical lamp source emitting 5 watts of said light per inch of cylinder length;
   (b) exposing the pressure-sensitive adhesive of a tape to the field of light while excluding oxygen from the surface of the adhesive during the exposure to said field of light while maintaining the adhesive at a temperature at which the rate of the reaction occurring in said adhesive which produces an increase in the creep resistance of said adhesive exceeds the rate of the degradative reaction which produces a reduction in the creep resistance of said adhesive; and
   (c) removing said pressure-sensitive adhesive from the field of light after exposing said adhesive for a period sufficient to produce at least a three-fold increase in creep resistance as measured in accordance with the creep resistance test herein set forth, the period of exposure not exceeding about 20 seconds.

6. A method in accordance with claim 5 wherein said adhesive contains an agent selected from the group consisting of aromatic aldehydes and aromatic ketones, said aromatic groups being free of phenolic hydroxy groups.

7. A method in accordance with claim 6 wherein said agent is a benzophenone compound.

8. A method of improving the creep resistance of a pressure-sensitive adhesive tape comprising:
   (a) providing a field of polychromatic light including having wavelengths in the ultraviolet region between about 2,000 and 4,000 Angstroms from a source radiating light in said ultraviolet region at an intensity at least equal to that provided by a cylindrical lamp source emitting 5 watts of said light per inch of cylinder length;
   (b) immersing a pressure-sensitive adhesive tape in a liquid medium substantially transparent to wavelengths in said ultraviolet region;
   (c) exposing the pressure-sensitive adhesive of said tape while immersed in the liquid medium to the field of light;
(d) cooling the liquid medium in contact with the adhesive to maintain the temperature thereof below about 100° C. while in said field of light; and
(e) removing said pressure-sensitive adhesive from the field of light after exposing said adhesive for a period sufficient to produce at least a three-fold increase in creep resistance, the period of exposure not exceeding about 20 seconds.

9. A method in accordance with claim 8 wherein said adhesive contains an agent selected from the group consisting of aromatic aldehydes and aromatic ketones, said aromatic groups being free of phenolic hydroxy groups.

10. A method in accordance with claim 9 wherein said agent is a benzophenone compound.

11. A method of improving the creep resistance of a pressure-sensitive adhesive tape comprising:
(a) providing a field of polychromatic light including light having wavelengths in the ultraviolet region between about 2,000 and 4,000 Angstroms from a source radiating light in said ultraviolet region at an intensity at least equal to that provided by a cylindrical lamp source emitting 5 watts of said light per inch of cylinder length;
(b) passing light from said source through a medium transparent to light having wavelengths in said ultraviolet region and substantially opaque to light in the infrared region; and
(c) exposing the pressure-sensitive adhesive of a tape to the light passing through said medium for a period not exceeding about 20 seconds while excluding oxygen from the surface of the adhesive during said period to produce at least a three-fold increase in creep resistance.

12. A method in accordance with claim 11 wherein said adhesive contains an agent selected from the group consisting of aromatic aldehydes and aromatic ketones, said aromatic groups being free of phenolic hydroxy groups.

13. A method in accordance with claim 11 wherein said agent is a benzophenone compound.

14. A method in accordance with claim 11 for improving the creep resistance of a pressure-sensitive adhesive tape wherein the adhesive contains polymerized trimethyldihydroquinoline.

15. A pressure-sensitive adhesives tape having the creep resistance thereof improved by the method of claim 1.

16. A pressure-sensitive adhesive tape having the creep resistance thereof improved by the method of claim 5.

References Cited

UNITED STATES PATENTS

| | | | |
|---|---|---|---|
| 2,047,880 | 3/1936 | Morse | 117—93.31 |
| 2,956,904 | 10/1960 | Hendricks | 117—93.31 |
| 3,157,560 | 11/1964 | Livingston et al. | 161—106 |

OTHER REFERENCES

Martin, Use of Radiation to Promote Chemical Reactions, Chem. and Eng. News., vol. 33, No. 14, April 1955, pp. 1424–1428.

SAMUEL H. BLECH, *Primary Examiner.*

MURRAY TILLMAN, *Examiner.*

R. B. TURER, N. F. OBLON, *Assistant Examiners.*